Figure 3:
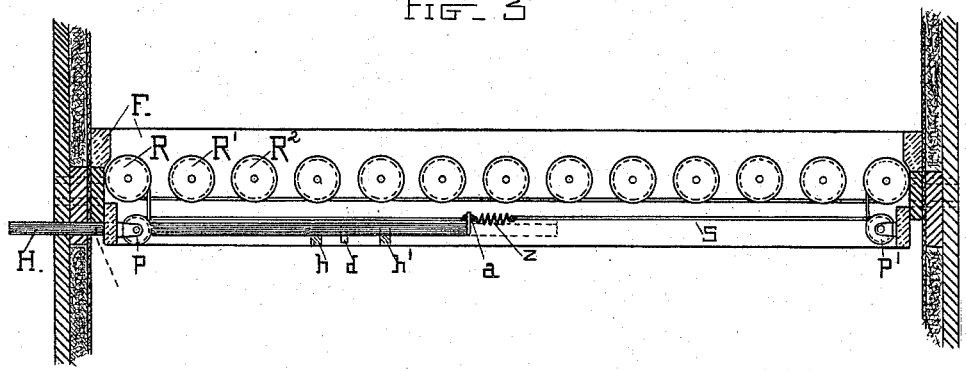

(No Model.)  3 Sheets—Sheet 1.
H. O. WESTENDARP.
THERMAL REGULATOR FOR INCUBATORS.
No. 568,123. Patented Sept. 22, 1896.
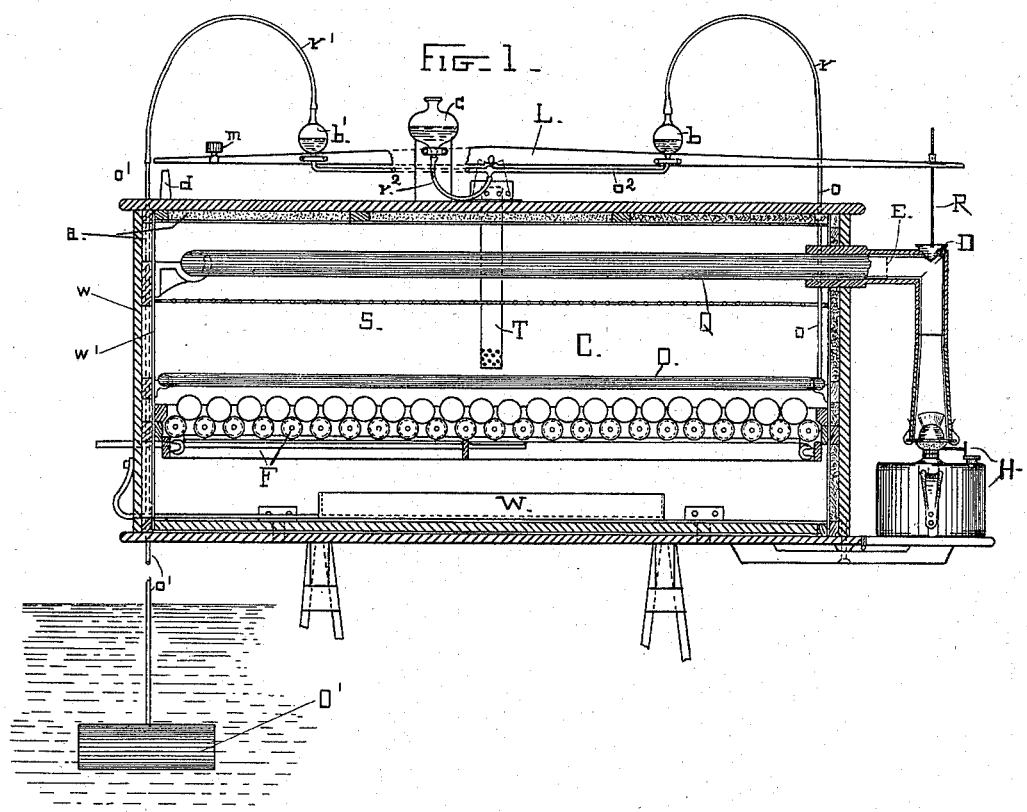
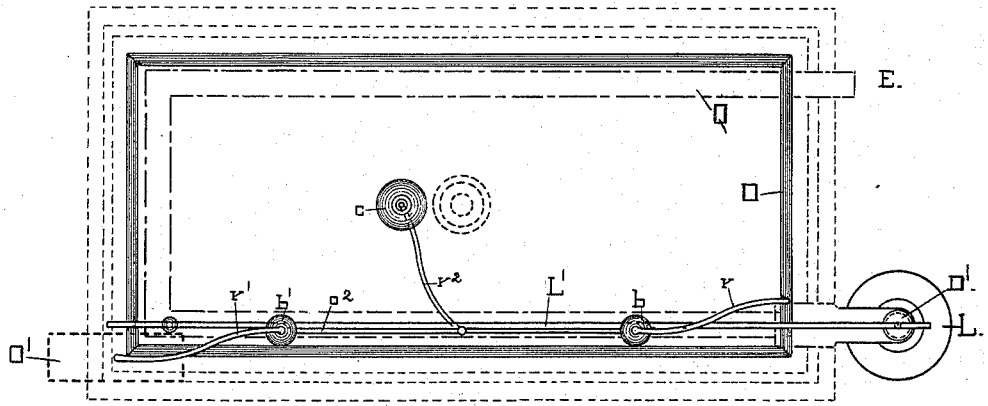
WITNESSES
John W. Gibboney
Henry M. Hobart
INVENTOR
Henry O. Westendarp (No Model.)  3 Sheets—Sheet 2.

H. O. WESTENDARP.
THERMAL REGULATOR FOR INCUBATORS.

No. 568,123. Patented Sept. 22, 1896.

WITNESSES
John W. Gibboney
Henry M. Hobart

INVENTOR
Henry O. Westendarp.

(No Model.) 3 Sheets—Sheet 3.
H. O. WESTENDARP.
THERMAL REGULATOR FOR INCUBATORS.
No. 568,123. Patented Sept. 22, 1896.
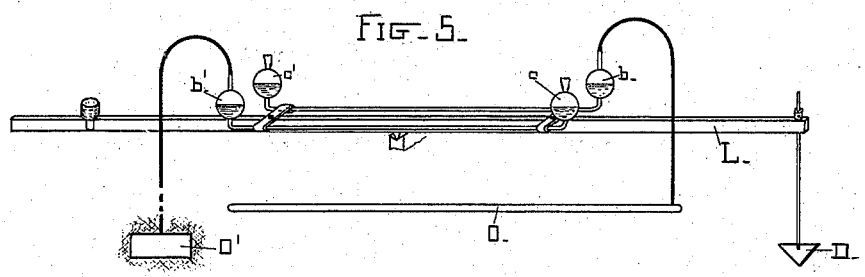
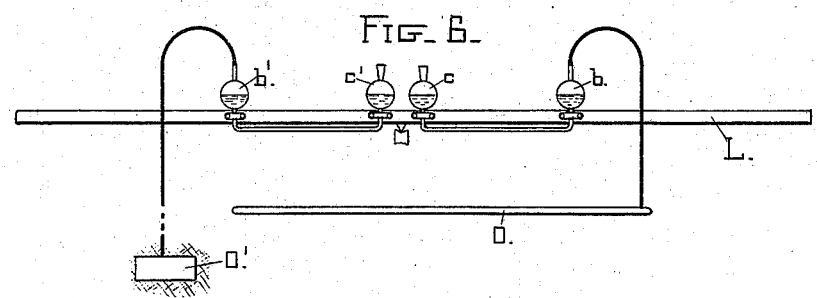
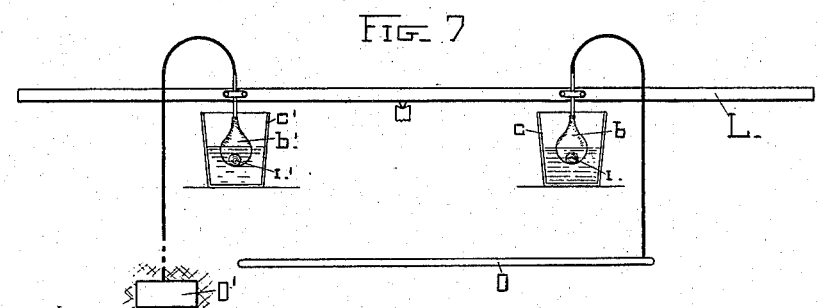
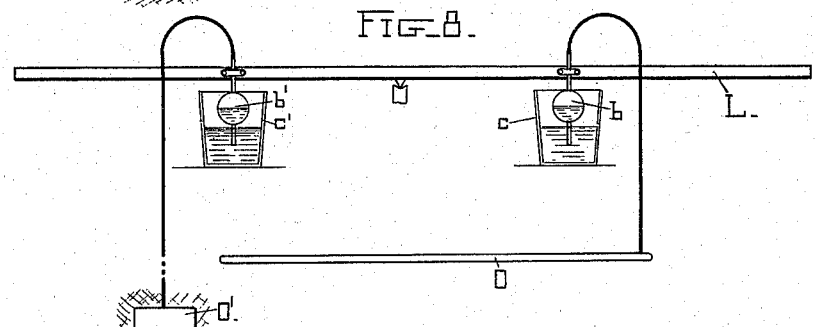
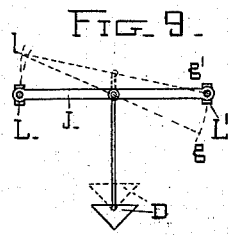
WITNESSES
John W. Gibboney
Henry M. Hobart
INVENTOR
Henry O. Westendarp

UNITED STATES PATENT OFFICE.

HENRY O. WESTENDARP, OF SAUGUS, MASSACHUSETTS

THERMAL REGULATOR FOR INCUBATORS.

SPECIFICATION forming part of Letters Patent No. 568,123, dated September 22, 1896.

Application filed September 9, 1895. Serial No. 561,920. (No model.)

*To all whom it may concern:*

Be it known that I, HENRY O. WESTENDARP, a citizen of the United States, and a resident of Saugus, in the county of Essex and Commonwealth of Massachusetts, have invented certain new and useful Improvements in Thermal Regulators for Incubators, &c., which I describe and claim as follows:

My invention relates to incubators used for the artificial hatching of eggs and to temperature-regulating apparatus therefor; and its objects are, first, to secure an exact regulation of the temperature, so as to maintain it at that selected degree which has been determined to be best for incubation, usually near 103° Fahrenheit; secondly, to secure compensation for the effects of changes in barometric pressure and external temperature, which influence some of the simplest, most sensitive, and, therefore, preferred types of temperature-regulators; to accomplish the regulation of temperature while at the same time securing adequate ventilation without renewing so much of the air within the incubation-chamber as has been customary heretofore, and thus saving heat; to provide a sensitive regulating apparatus which shall still be positive in action in increasing or decreasing the heat in the incubation-chamber as may be demanded.

My invention does accomplish these results; and it consists in a novel method of regulation apparatus adapted to operate by this method, and certain improvements in mechanism for incubators, which I will now describe by reference to the accompanying drawings, which constitute a part of this specification.

It will first be remarked that throughout this specification I will only briefly refer to parts that are old and whose action is well understood and will restrict myself as closely as possible to what I think is novel in my present apparatus.

Figure 1 is a sectional view of an incubator embodying the improvements of my present invention. Fig. 2 is a top view of the same; and Figs. 3 and 4 relate to details of construction of the egg-tray, while Figs. 5, 6, 7, 8, and 9 show modifications of the temperature-regulating apparatus of Fig. 1, being somewhat changed in arrangement, but operating upon the same general principles.

In Fig. 1 it is shown that I employ the usual closed chamber C, having insulated sides $w$ $a$ $w'$, of suitable material, $w$ $w'$ being, say, wood, and $a$ representing asbestos, air-insulation, or any other good heat-insulator. Within this chamber is provided also the usual egg-tray F, supported upon cleats at its ends, so that it may be removed from the chamber at will.

Q is a metallic tube of, say, copper, which may extend around three sides of the chamber C and connect to the chimney of a lamp H. This is indicated in the plan view, Fig. 2, and its open end is seen to extend outside the chamber C, (noted at E in this figure.) So arranged a circulation of heated air from the lamp H will, when the damper D is closed, circulate through the tube Q and heat the chamber C. The heat from the lamp H is regulated either by reducing the size of the flame, as by raising or lowering the wick, or by raising and lowering a movable sleeve surrounding the wick and flame, or by, at times, diverting the heated gases to the outer air by the opening of the damper D. The latter method is preferred as being less liable to get out of order and thus endanger the safety of the eggs. In either case the regulation is accomplished by the movements of a lever L or equivalent device supported, preferably, upon the apparatus itself and pivoted so as to be able to take up a reciprocatory motion in response to pressure upon one side or the other of its pivot, a movement in one direction being followed by an increase of heat in the chamber C, and vice versa. The lever L is connected by a rod R to the damper D. When the damper is closed, the heated air is forced through the tube Q. When it is open, the heated air escapes directly into the open air. This is a well-known arrangement.

Within the chamber C is a receptacle O, which has, preferably, considerable capacity and is also made with preferably very thin walls, and which is filled with air. It may be given any desired form, but as shown is rectangular and extends around inside the chamber C near its walls or sides. It thus exposes a large surface to the air within the receptacle O. It is entirely closed, except at one point, where it is connected by a small pipe $o$ to the top of a bulb $b$, which bulb is preferably made of glass and is mounted upon one end of the lever L, connection between the bulb $b$ and the pipe $o$ being made by a flexible tube $r$, such as rubber, so as to allow a limited free movement of the lever and bulb borne thereby. Upon the opposite end of the lever L is mounted another bulb $b'$, which communicates with the bulb $b$ by the tube $o^2$, uniting their bottoms, and these bulbs and the tube connecting them are conveniently made of one piece of glass. The bulb $b'$ communicates with another closed air-receptacle O', which is preferably, though not necessarily, made to have about the same capacity as the chamber or receptacle O, and this receptacle O' is maintained at as constant a temperature as possible. Both bulbs $b$ $b'$ communicate also with a vessel $c$, preferably made of glass, whose top is open to the air through an opening which is preferably quite restricted, and which opening may, if desired, be closed by a flexible diaphragm, as of rubber, to keep out dust and prevent evaporation of the fluid it is intended to contain.

The chamber C has a ventilating-tube T, extending downward, as shown, open at its top to the outer air and at its bottom to the chamber C at a point considerably below the hot-air-circulation pipe Q, and relatively near the egg-tray. If desired, a damper may be provided for this tube T, which is operated by the movements of the lever L, so as to be opened and closed when the damper D is opened and closed.

F is an egg-tray, which will be described in detail hereinafter, and W is a pan containing water to maintain the necessary amount of moisture within the chamber C.

S is a wire screen supported a short distance below the tube Q, and its function is to absorb the heat emanating from the tube Q and distribute it uniformly throughout the egg-chamber, and it fulfills its office in virtue of its large surface and the fact that the rays of heat being given off normal to the surface of round wires radiate in every direction, and this causes an intermingling of the heat-rays and a uniform distribution of the heating effect. It will be seen that a flat metal sheet or even a perforated metal sheet will not produce the effect aimed at by this arrangement.

The operation of the apparatus whose parts have been so described is as follows: The bulbs $b$ $b'$ and the vessel $c$ are at first partly filled with water or other liquid, and of course the connecting-tubes $o^2$ $r^2$ are also filled. There are thus provided two entirely-closed and distinct air-receptacles, the air in each of which is able to respond to variations of barometric pressure, such pressure being exerted on the liquid in the vessel $c$, which, as stated, communicates with both bulbs $b$ $b'$ and the outer air; but it will be evident that, as the receptacles O O' are of about the same capacity and the bulbs $b$ $b'$ are situated upon opposite ends of the lever L, that is, upon either side of its pivot, the effects of pressure on the lever by the rise and fall of the liquid in the bulbs $b$ $b'$, in response to such changes in barometric pressure, are balanced, so that the resultant effect is practically *nil*. It follows, then, that the temperature-regulating apparatus R D, which operates upon the expansion and contraction of air in the receptacle O, followed by a shifting of the liquid from one part of the lever L to another, becomes unresponsive to changes of barometric pressure. Further, it is seen that the air in the sealed air-receptacle to which the bulb $b'$ is connected will, if subjected to the variations of external temperature, expand or contract, and thus errors would again be introduced into the regulation. To avoid this, the receptacle O' is maintained at an approximately constant temperature. This is conveniently accomplished by burying it in the earth, as indicated in Fig. 1. I have found by experiment that during the period of time required for incubation the temperature of the earth, at a moderate depth, is practically constant.

Another way of maintaining the temperature of the air in the vessel O' constant when it cannot conveniently be buried is to place it in a vessel, which may or may not be filled with water, in which is constantly kept a piece of ice, when the temperature will remain at about the freezing-point, Fahrenheit. By thoroughly insulating the vessel containing the ice to prevent its absorption of heat the amount of ice needed to be consumed is very small indeed. Again, the vessel or receptacle O' may be placed within the chamber C itself and coated with a very thick covering of insulation. In this case the receptacle O will respond quickly to changes of temperature in the chamber C, while the heavily-insulated vessel O' responds to or follows the average temperature therein. I have found by experiment, however, that this latter arrangement is more difficult to adjust and is not so reliable. In any of these ways of working the weight $m$ or other adjuster of the movements of the lever L is set at such a position by preliminary trials as will cause the lever to act to diminish the heat when the desired maximum temperature exists in the chamber C and increase the heat again when a predetermined minimum fall of temperature in the chamber C has taken place.

In Fig. 2, which is, as stated, a plan view of the apparatus Fig. 1, similar parts are marked by the same letters as in Fig. 1, and their relative positions are so clearly shown that they need not be further described.

Figure 4:
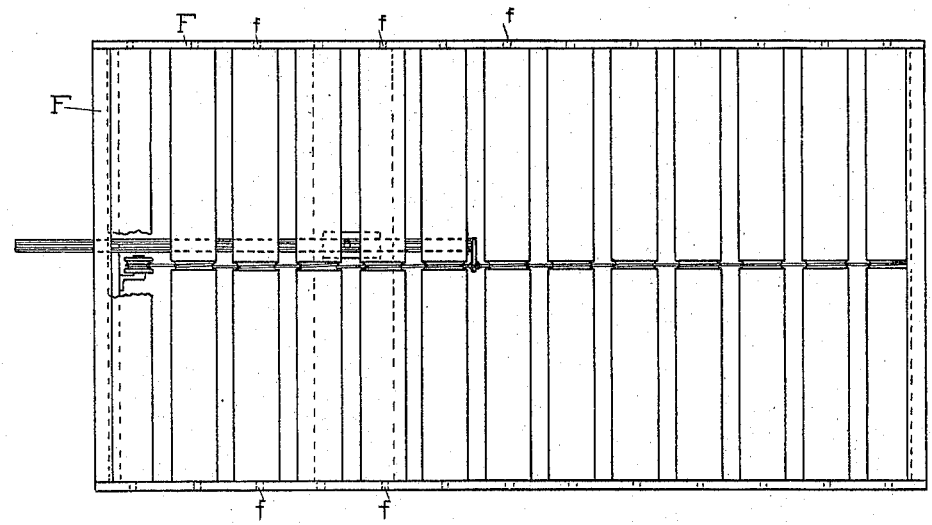

In Figs. 3 and 4 are illustrated in sectional and plan view, respectively, a preferred form of egg-tray which may be used with my apparatus. In these figures R R' R², &c., are a series of rollers, as many as may be desired, journaled at $f f' f^2$, &c., in the sides of the movable frame F F, so as to be able to rotate. $p p'$ are small pulleys borne upon supports attached to the frame F F, as shown. Starting at the point $a$, a string or cord passes around the pulley $p$, and then around the rollers $R'$ $R^2$ $R^3$ successively in the same direction of rotation, then around the pulley $p'$, and then back to the starting-point $a$, a spring Z being preferably placed between the ends of the string to take up any slack therein and keep it taut or under a certain tension. A rod or handle H' is fastened at one end to the string at the point $a$ and the other end passes out through the casing of the chamber C. The reciprocation of this handle H', whose movements are limited by a pin $d$ and studs $h$ $h'$, respectively, cause the eggs upon the rollers R', &c., to turn, say, half a revolution. This tray is very readily removed from the chamber C, without disconnecting any of the parts, by simply slightly rotating the handle H', so as to free the pin $d$ from the studs $h$ $h'$, when it may be pushed into the chamber, as indicated by the dotted line, and the tray removed bodily. The tray F is just as readily reinserted by reversing these actions.

The temperature-regulating apparatus, which, as stated, is constructed to be unaffected by changes of external pressure or temperature, may be modified in a number of different ways, some of which are illustrated in Figs. 5, 6, 7, 8, and 9. Broadly stated, the principle upon which my temperature-regulating apparatus operates is by balancing the effects of barometric changes or pressure on the lever L or equivalent apparatus by causing such changes to act equally upon each side of its pivot, and there are obviously a number of forms of apparatus which may operate upon this principle. In these figures the essential modified elements of my regulator are alone illustrated, and parts having similar functions to those of Fig. 1 are denoted by similar index-letters. In Fig. 5 it is shown that instead of connecting the bulbs $b$ $b'$ to a common vessel $c$, Fig. 1, two vessels $c$ $c'$ may be used, situated upon opposite ends of the lever L from that which carries the bulbs $b$ $b'$, respectively, the vessels $c c'$ being, of course, open to the atmosphere. The weight in $b$ being diminished while that in $c'$ increases during the regulating movements of the liquid, the effect is, of course, doubled. Barometric changes of pressure on the liquid in $c'$ $b$ and $c$ $b'$ being equal have, of course, no effect in causing movement of the lever or regulator R D. An evident modification of this arrangement is shown in Fig. 6, where the bulbs $b$ $b'$ are situated the same as before, but the vessels $c$ $c'$ are placed on the same side of the pivot as their connected bulbs, just as though the vessel $c$, Fig. 1, were divided.

In Fig. 7, $b$ $b'$ represent rubber balloons or diaphragms with weights $i$ $i'$ therein to cause their immersion in the liquid of the vessels $c c'$, which are open to the atmosphere. The contraction or expansion of the air in O $b$ and O' $b'$ in response to external barometric changes is balanced as before.

An evident modification of Fig. 7 is seen in Fig. 8, where bulbs $b$ $b'$ are partly filled with liquid and have their lower ends or tubes depending therefrom dipped below the surface of the liquid in the vessels $c$ $c'$. The operation is, of course, the same as before, to cause corresponding changes upon each side of the lever L by barometric pressure and therefore to unaffect its working.

Still another modification of the apparatus which involves the same method of operation is shown in Fig. 9. Here the bulbs or the outlets for the respective air-receptacles are mounted each upon its own lever L L', and the ends of these levers are united by a cross-piece J, from which a connection goes to the damper D. When a change of level of the fluid in the bulbs upon the levers L L' occurs, the ends connected to the piece J move in opposite directions, so that the piece J takes the position indicated in dotted lines at $l$ $g$ and the damper D remains unmoved; but when the lever L is moved by an increase of temperature, as, for instance, by the expansion of air in Q, Fig. 1, it alone moves upward and L' remains stationary, and then the cross-piece J takes the position shown by the dotted line $l g'$ and the damper D is lifted to decrease the heat. The various arrangements illustrated in Figs. 5, 6, 7, 8, and 9 are therefore merely indicative of some of a number of apparatuses which may be operated in accordance with my invention.

It will be noted that as to the temperature-regulator herein described none of the air-receptacles O O' or bulbs $b$ $b'$ are subjected to air-pressure. It is evident that if these receptacles O O' $b$ $b'$ constituted an entirely-closed system they would at times be subjected to compression and at other times to expansion following changes of external barometric pressure. This would necessitate that these vessels be made very thick if they are to withstand such pressure without yielding; but such a construction is not conducive to quick response to thermic changes in the chamber C. This same objection applies if a vacuum system is used, or a partial vacuum, with volatile fluids in the vessels, which fluids are moved in one or the other direction by the contraction and expansion of their vapors. A still greater disadvantage in the use of such an absolutely-closed system containing fluid is that expansion upon one side of the contained gas involves compression in the other receptacle of its gas. This at once lessens the amount of fluid which can be transferred for a given temperature change, even though the vessel O' be made, relatively, of much larger capacity than O. I have found by practice that it is extremely difficult and in fact impracticable to construct an apparatus of such character and regulate it with the precision easily obtained in my improved apparatus herein described.

While I have shown this temperature-regulator as applied especially to an incubating apparatus, it may, of course, be used with any other type of heating apparatus or to the regulation of the temperature in greenhouses, hotbeds, &c., and it is a very cheap apparatus, positive in action, and not likely to get out of adjustment, and is also able to be adjusted or repaired by a person possessed of moderate skill.

It is to be understood also that the vessel O', referred to herein as having a capacity about equal to that of the vessel O, may have either a larger or smaller capacity provided, of course, that suitable compensation for this departure from uniformity be made. Thus, referring to Fig. 5, for example, if the vessel O' is larger than O, the bulbs $b'$ $c$ would also be larger and would be placed nearer to the fulcrum or pivot, so as to have a leverage dependent upon the relative weights of liquid moved as compared with the movement of liquid between $c'$ $b$; or, again, if the vessel O' is the smaller, then the bulbs $b'$ $c$ are made relatively smaller and are disposed to have a proportionately-increased leverage on the system. Other ways of accomplishing the same result may be used without departing from my invention.

Having thus described my invention, what I claim is—

1. The combination in a temperature-regulator, of a pivoted lever, a chamber containing liquid upon one side of said lever and communicating with a closed vessel or receptacle situated in the space where the temperature is to be regulated or maintained constant, another chamber or receptacle upon the opposite side of said lever and communicating with another closed receptacle not subjected to the heating and cooling effects of said first receptacle, a vessel or vessels open to the atmosphere, containing fluid and communicating with the movable chambers carried upon said lever, and connections between said lever and apparatus for controlling a heating source; all constructed and arranged as described, so that movements of said liquid due to variations of temperature shall accomplish regulation toward a condition of constancy, while movements of said liquid due to barometric changes or atmospheric pressure shall be balanced or opposed in effect upon the two sides of said lever and thus fail to actuate it.

2. The combination in a temperature-regulator, of a pivoted lever having connections to a device for controlling a heating source and supporting upon both sides of its fulcrum vessels containing a liquid responsive to variations of atmospheric pressure, and two inclosed air or gas receptacles communicating, respectively, with said liquid-containing vessels, one of said air-receptacles being situated in the space the temperature of which is to be regulated; said parts being constructed and related so that changes of hydrostatic pressure upon said lever due to differences of temperature in the two said air-receptacles shall actuate said lever, while changes of hydrostatic pressure caused by barometric variations shall be balanced and have no influence upon said lever to cause its movement.

3. In a hydrostatically-operated temperature-regulator, two receptacles or inclosures containing air and having fluid seals, mechanism for controlling a heating source, and supports and connections between said receptacles and the heat-controlling mechanism, whereby movements of the liquid in said inclosures, due to barometric changes, act in opposition upon the heat-controlling mechanism.

4. In an incubator or other similar apparatus, and in combination, an inclosed chamber, a support for the eggs or other things to be heated, an inclosed air-receptacle within said chamber, a second inclosed air-receptacle maintained at a practically constant temperature, a pivoted lever, bulbs carried upon each side of said lever, respectively, and having connections with said air-receptacles and also with another bulb or vessel open to the atmosphere, a lamp or other heating source, a regulator for controlling the supply of heat from said lamp to the air-receptacle within the incubation or heated chamber, and connections between said lever and the heat-regulator, substantially as shown and described.

5. The combination in a temperature-regulator, of two receptacles containing air one of which is situated in the inclosed space the temperature of which is to be regulated and each having its end closed by a movable or yielding seal, an auxiliary receptacle containing liquid open to the outer air and inclosing or communicating with said air-receptacles, a heating source having connections to said space, and mechanism for controlling said heating source responsive to the differential action of said air-receptacles.

6. In an incubator, the combination of an inclosed chamber containing an egg-tray and a heating pipe or tank, an inclosed air-receptacle within said chamber, a second inclosed air-receptacle maintained at practically constant temperature or situated in a space the temperature of which is nearly constant, a heating source having connections to said pipe or tank, heat-controlling mechanism for said heating source, and a device having connections to said air-receptacles responsive to the differential effects of temperature changes therein adapted to actuate said heat-controlling mechanism, substantially as and for the purpose described.

7. The combination in an incubator, of an incubation-chamber, a heating supply therefor, an inclosed air-receptacle therein, a second inclosed air-receptacle buried in the earth or otherwise maintained at constant temperature, a pivoted lever, two bulbs partly filled with liquid supported upon said lever (one upon each side of its pivot) and moving therewith, an auxiliary bulb also partly filled with liquid and open to the atmosphere and having connections to the bulbs supported by the lever, so that changes of barometric pressure may cause a simultaneous change of the hydrostatic level of the liquid in said movable bulbs, and connections from said lever to a damper, valve or other equivalent device for controlling the heat supply, substantially as described.

HENRY O. WESTENDARP.

Witnesses:
 JOHN W. GIBBONEY,
 HENRY M. HOBART.